United States Patent
Shanmugam et al.

(10) Patent No.: US 10,373,203 B2
(45) Date of Patent: Aug. 6, 2019

(54) SMART CONTENT DELIVERY USING BEACONS

(71) Applicant: Verizon Patent and Licensing Inc., Arlington, VA (US)

(72) Inventors: Sankar Shanmugam, Dayton, NJ (US); Amit Mahajan, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 618 days.

(21) Appl. No.: 14/663,357

(22) Filed: Mar. 19, 2015

(65) Prior Publication Data
US 2016/0275556 A1 Sep. 22, 2016

(51) Int. Cl.
*G06Q 30/02* (2012.01)
*H04W 4/80* (2018.01)

(52) U.S. Cl.
CPC ..... *G06Q 30/0261* (2013.01); *G06Q 30/0267* (2013.01); *H04W 4/80* (2018.02)

(58) Field of Classification Search
USPC ............... 342/386, 450; 340/10.1; 455/41.2
See application file for complete search history.

(56) References Cited

U.S. PATENT DOCUMENTS

| | | | | |
|---|---|---|---|---|
| 7,010,267 | B2* | 3/2006 | Vanluijt | G06Q 20/382 |
| | | | | 455/41.2 |
| 9,135,612 | B1* | 9/2015 | Proctor, Jr. | G06Q 20/202 |
| 2006/0087474 | A1* | 4/2006 | Do | G01S 1/024 |
| | | | | 342/386 |
| 2007/0132637 | A1* | 6/2007 | Kolavennu | G01C 21/16 |
| | | | | 342/450 |
| 2009/0131079 | A1* | 5/2009 | Sekhar | H04W 4/02 |
| | | | | 455/456.3 |
| 2010/0066503 | A1* | 3/2010 | Rhie | G01S 1/68 |
| | | | | 340/10.1 |
| 2015/0140982 | A1* | 5/2015 | Postrel | H04W 4/008 |
| | | | | 455/418 |

* cited by examiner

*Primary Examiner* — Saba Dagnew

(57) ABSTRACT

Techniques described herein may allow for the registration of demo devices (e.g., for-sale wireless telephones, tablet computers, etc.), and the presentation of content, such as promotional content, for the demo devices. The demo devices may output a beacon via a short-range protocol, which may include unique identifiers of the demo devices. When a customer device approaches a demo device, the customer device may automatically detect the beacon and obtain promotional content regarding the demo device, and present the promotional content to a customer.

20 Claims, 9 Drawing Sheets

SMART CONTENT DELIVERY USING BEACONS

BACKGROUND

Vendors, that offer devices for sale, often provide information regarding the devices. For example, a wireless telephone store may display static signs or videos regarding wireless telephones that are offered for sale. Short-range wireless solutions, such as Bluetooth Low Energy ("BLE"), Near Field Communication ("NFC"), etc., allow for the detection of devices that are in close proximity to other devices. These short-range wireless solutions may be used in retail stores, in order to enhance the overall in-store shopping experience.

DETAILED DESCRIPTION OF PREFERRED EMBODIMENTS

The following detailed description refers to the accompanying drawings. The same reference numbers in different drawings may identify the same or similar elements.

Some implementations, described herein, may provide for targeted advertising, regarding demo devices, to be presented to users who are near the demo devices. The techniques, described herein, may be useful in, for example, retail stores that sell the demo devices. As referred to herein, a "demo device" may be a device for sale (or a "floor model" of the device for sale). Examples of demo devices include wireless telephones, tablet computers, laptop computers, and/or other types of devices. The targeted advertisements may be delivered directly to a customer's device (e.g., the customer's wireless telephone). Furthermore, the targeted advertisements may be tailored to the customer (e.g., based on the customer's demographics, likes and dislikes, past purchasing history, etc.) and/or to the customer's device (e.g., based on the operating system of the customer's device, applications on the customer's device, make and/or model of the customer's device, etc.).

Figure 1:
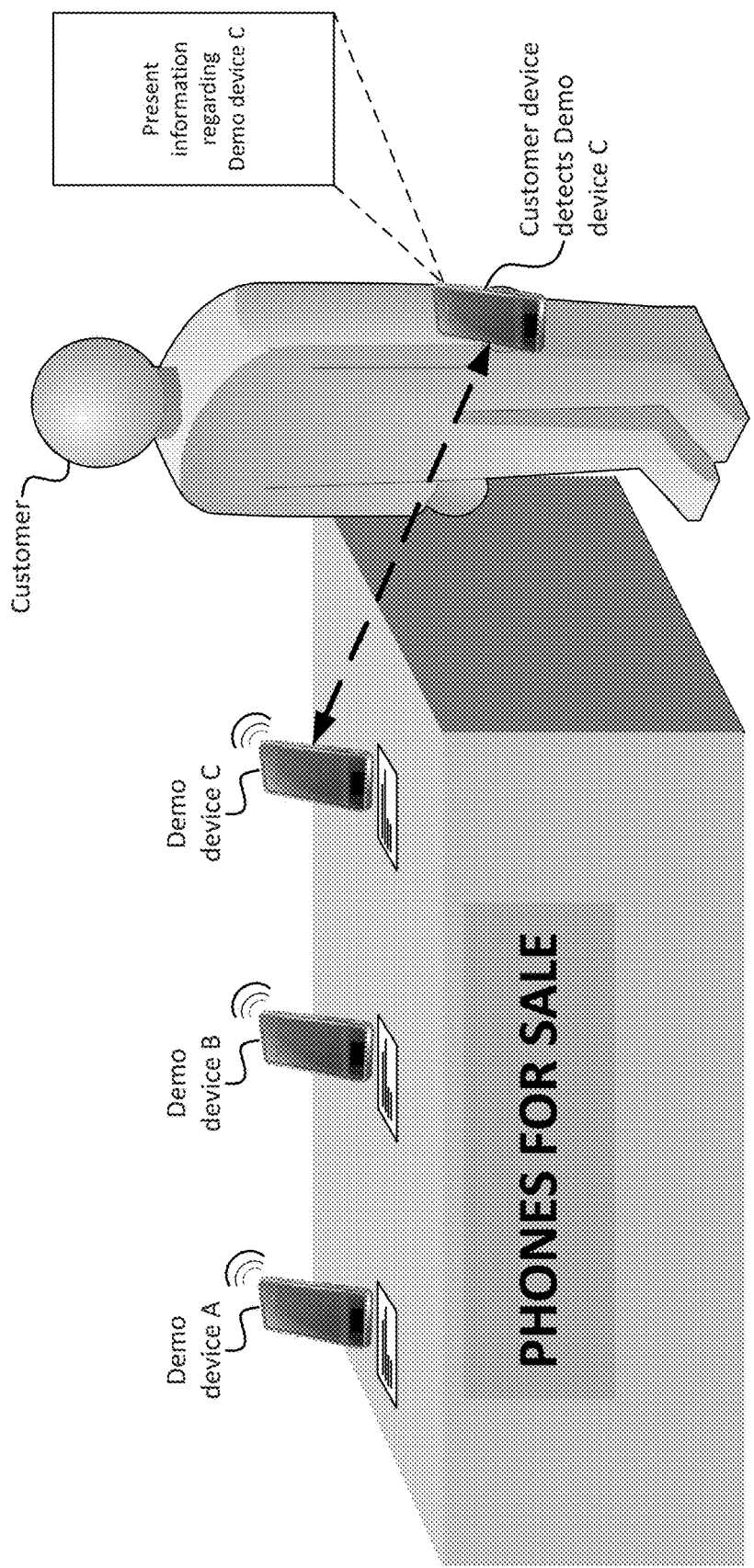
FIG. 1 illustrates an example overview of implementations described herein, in which targeted content, regarding a demonstration ("demo") device may be presented to a nearby user.

For example, as shown in FIG. 1, a customer may be present in a store where wireless telephones are sold. Three wireless telephones may be on display at the store. In accordance with some implementations, these telephones may be configured as demo devices (i.e., Demo device A, Demo device B, and Demo device C). The demo devices, may broadcast a short range beacon (such as a BLE beacon, a Wi-Fi beacon, a ZigBee beacon, an infrared beacon, and/or some other type of beacon). The beacon may include an identifier associated with the demo device, such as a Bluetooth device name, a machine access control ("MAC") identifier, a Service Set Identifier ("SSID"), etc. Since the identifier is unique to the demo device, a connection need not be established between the customer's device and the demo device in order for the customer device to eventually ascertain the identity of the demo device.

The customer's device may detect the beacon from one or more of the demo devices, and may determine, based on the beacon(s), which demo device is closest. For example, in FIG. 1, the customer's device may determine that Demo device C is the closes demo device. As described further below, the customer's device may retrieve targeted advertising content, regarding Demo device C. For example, the customer's device may communicate with a content server (e.g., via the Internet), which provides the targeted advertising content. As mentioned above, the content server may tailor the content to the user based on information associated with the user. The customer's device may present the targeted advertising content (e.g., as a pop-up window, as a video, etc.).

By providing targeted advertising content based on users' proximity to demo devices, vendors of the demo devices may increase customer awareness of the demo devices, potentially increasing sales. Furthermore, the targeted advertising content may enhance customers' experiences, by providing information regarding products they wish to potentially purchase.

Figure 2:
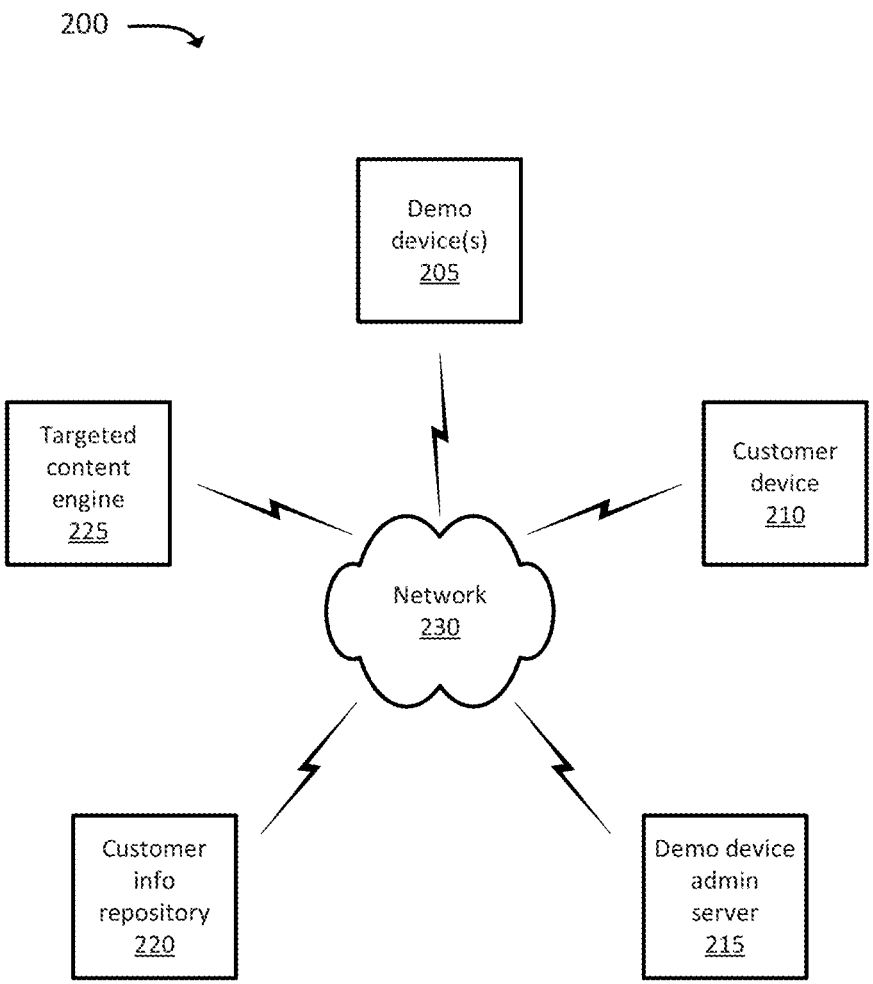
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include one or more demo devices 205, customer device 210, demo device admin server 215, customer info repository 220, targeted content engine 225, and network 230.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

Demo device 205 may include any computation and communication device that is capable of communicating with one or more networks (e.g., network 230). For example, demo device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. Demo device 205 may include logic and/or hardware circuitry to communicate via one or more "short range" wireless protocols, such as BLE, NFC, Wi-Fi (e.g., based on an Institute of Electrical and Electronics Engineers Institute of Electrical and Electronics Engineers ("IEEE") 802.11-based standard), ZigBee (e.g., based on an IEEE 802.15.4-based standard), or the like. Demo device 205 may, for instance, communicate with other devices, such as customer device 210, via a short range wireless protocol. Demo device 205 may generally be a device (e.g., a mobile device, a tablet computer, etc.) that has been designated as a device that is to be on display for retail or promotional purposes. According to implementations described herein, such demo devices 205 may be used in conjunction with, or in lieu of, traditional beacon-emitting devices. This may enhance geo-fencing and/or other applications in which beacons are used.

As described below, demo device 205 may register (e.g., with demo device admin server 215) as a demo device. In some implementations, demo device 205 may include functionality (e.g., via an application level application, via operating system or firmware level software, etc.) to register as a demo device. For instance, a manufacturer of demo device 205 may ship demo device 205 with such functionality, an owner and/or operator of a wireless telecommunications network (e.g., a "carrier") may install the functionality (e.g., at a retail location associated with the wireless telecommunications network), etc. As part of the registration process, demo device 205 may be automatically configured to act as a beacon device within the context of the retail outlet (e.g., a store) at which the demo device is being sold. Advantageously, and as will be described in more detail below, as part of the initial configuration of a device as a demo device, the device may also be automatically configured to act as a beacon.

Customer device 210 may include any computation and communication device that is capable of communicating with one or more networks (e.g., network 230). For example, customer device 210 may include a radiotelephone, a PCS terminal, a PDA, a smart phone, a laptop computer, a tablet computer, a camera, a television, a personal gaming system, a wearable device, and/or another type of computation and communication device. Customer device 210 may include logic and/or hardware circuitry to communicate via one or more short range protocol and may, for instance, communicate with other devices, such as demo device 205, via a short range wireless protocol. Additionally, or alternatively, customer device 210 may communicate with targeted content engine 225 (and/or other devices) via network 230. For example, customer device 210 may receive content from targeted content engine 225, and may display the content on a display screen associated with targeted content engine 225. Customer device 210 may sometimes be referred to as "user equipment" ("UE"), or as a "user device."

Demo device admin server 215 may include one or more devices (e.g., a single server device or a cluster of server devices) that provide for the setup and management of demo devices 205. Demo device admin server 215 may, for instance, participate in a registration process for demo device 205, in which demo device admin server 215 authorizes a particular demo device 205 to act as a demo device (e.g., to output a short range radio beacon). Demo device admin server 215 may store information regarding demo devices 205, such as a Bluetooth device name, a MAC address, a proprietary identifier, and/or other identifying information. As described below, the identifying information, regarding demo device 205, may be used (e.g., by targeted content engine 225) when providing targeted advertising content to customer device 210. Targeted content engine 225 may, in some implementations, receive content, regarding one or more demo devices 205, from a manufacturer and/or a service provider associated with respective demo devices 205. In some implementations, targeted content engine 225 may receive the content, cache the content (e.g., store the content locally and/or on one or more remote storage devices), and may provide the cached content (e.g., when a request is received from demo device 205, customer device 210, and/or another device). In some implementations, targeted content engine 225 may request the content from the manufacturer and/or a service provider (and/or another source) when a request for the content is received. Alternatively or additionally, demo device 205, or another device, may directly request content from the manufacturer and/or a service provider associated with the demo device.

Customer info repository 220 may include one or more devices (e.g., a single server device or a cluster of server devices) that store information regarding one or more customers (e.g., a customer associated with customer device 210). The information may be received from the customer (e.g., when the customer purchases customer device 210, purchases a wireless service plan associated with customer device 210, and/or at another time). In some implementations, the information may be received via data collection techniques, and may include behavioral information associated with the customer (e.g., locations that the customer has visited, products and/or services that the customer has purchased, web pages that the customer has visited, and/or other types of history information). Some or all of the information, stored by customer info repository 220, may be collected via an "opt-in" service, which a customer may "opt out" of at any time.

Targeted content engine 225 may include one or more devices (e.g., a single server device or a cluster of server devices) that provide content to customer device 210. The content may include advertising content, such as video content, audio content, image content, text content, and/or other types of content. The content may include promotional and/or advertising information regarding demo device 205, such as information regarding features, capabilities, discounts, etc. Targeted content engine 225 may determine which content to provide, based on for which demo device 205 content is being requested, and/or based on customer information (e.g., provided by customer info repository 220).

Network 230 may include one or more networks, via which one or more devices, shown in FIG. 2, may communicate. For example, network 230 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which demo device 205 and/or another device may communicate with the EPC network. The EPC network may include one or more serving gateways ("SGWs"), mobility management entities ("MMEs"), and/or packet data network ("PDN") gateways ("PGWs"), and may enable demo device 205 and/or customer device 210 to communicate with PDN 220 and/or an IP Multimedia Subsystem ("IMS") core network. The IMS core network may manage authentication, session initiation, account information, a user profile, etc. associated with demo device 205 and/or customer device 210. Additionally, or alternatively, network 230 may include one or more PDNs, such as the Internet, a metropolitan area network ("MAN"), a local area network ("LAN"), a wide area network ("WAN"), a private enterprise network, etc.

While not shown in this figure, one or more other devices may be present in environment 200. For example, in some implementations, a device, based on which content is presented, may be an external device with respect to demo device 205 and/or customer device 210. In some implementations, a device (e.g., a computation and communication device) that is external to demo device 205 may be used to register demo device 205 as a demo device.

Figure 3:
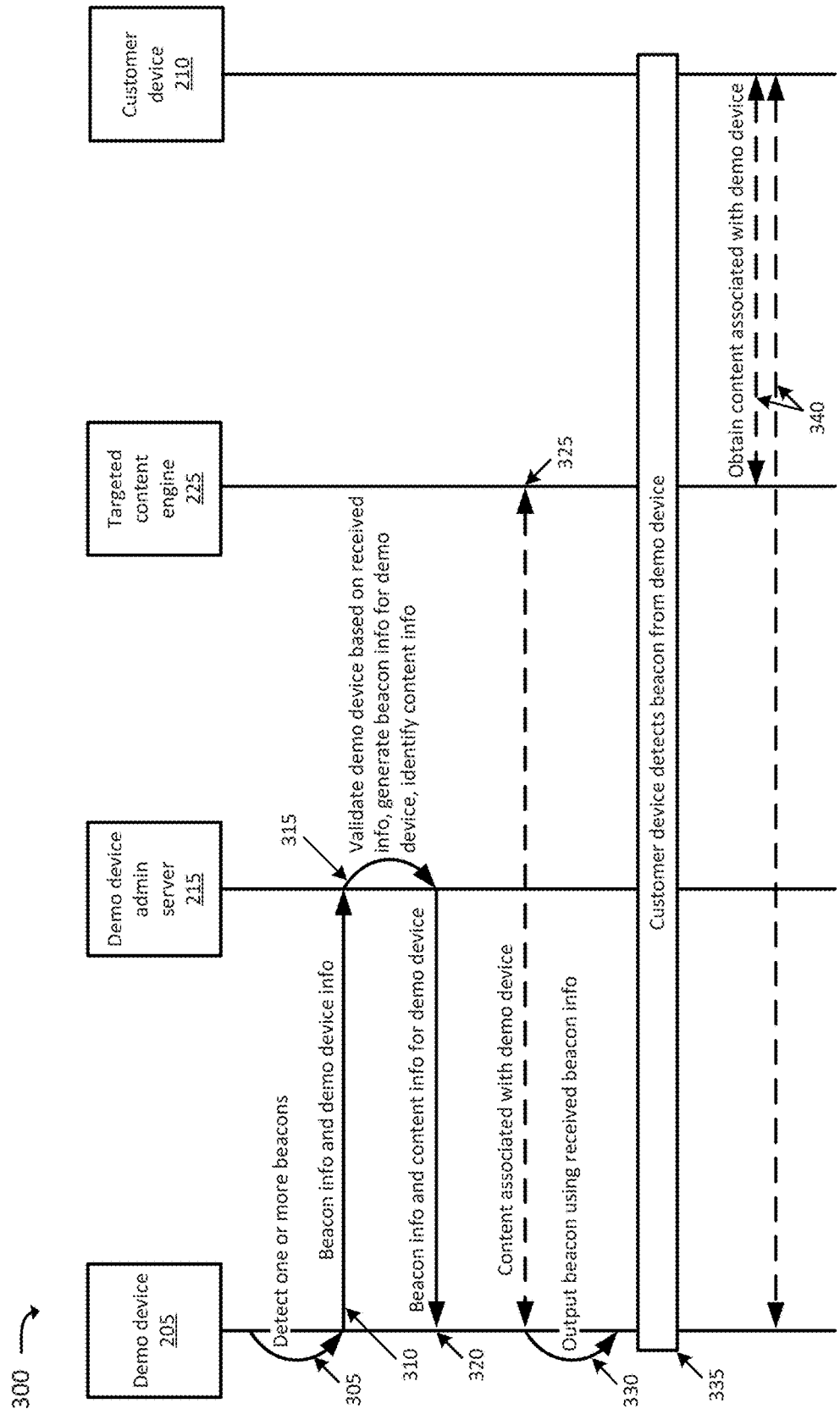
FIG. 3 illustrates an example process for registering as a demo device.

FIG. 3 illustrates a signal flow of an example process 300 for registering as a demo device, and presenting content associated with a registered demo device. In some implementations, demo device 205 may include operating system level or firmware level functionality, via which an operator (e.g., a manager of a retail store), may cause the registration process to begin. In some implementations, the functionality may be available through an administrator menu, which may not typically be accessible by end users. Prior the operations shown in process 300, in some implementations, a mobile device number ("MDN") may have been obtained for demo device 205. In some implementations, the obtained MDN may be a specific MDN, or from a pool of particular MDNs, that is (or are) associated with demo devices 205.

As shown, process 300 may include detecting (at 305) one or more beacons. For example, demo device 205 may be configured to detect beacons from one or more other demo devices 205, and/or another type of beacon (e.g., a fixed beacon in a retail store, a Wi-Fi router, etc.). Detecting the beacons may include detecting BLE devices, Wi-Fi devices, NFC devices, or other types of devices that are in range of demo device 205 (e.g., devices, that use short-range wireless technologies). Demo device 205 may detect, for example, Bluetooth device names, MAC addresses, SSIDs, Basic SSIDs ("BSSIDs"), proprietary identifiers, or the like, of the beacon-emitting devices (i.e., the devices from which a beacon is detected). Since NFC protocols are typically relatively short range, the detection of an NFC beacon may occur when an operator (e.g., a manager of the retail store) causes physical contact between demo device 205 and a beacon-emitting device (e.g., another demo device 205).

In addition to information regarding particular beacon-emitting devices, the detected beacons may identify, in a hierarchical manner, different items of information regarding the beacon-emitting devices. For example, one level of the hierarchy may be used to identify a store in which a particular beacon-emitting device is located, another level of the hierarchy may be used to identify a section of a store in which the particular beacon-emitting device is located, and another level of the hierarchy may uniquely identify the beacon-emitting device within the section or the store. In some implementations, the information, regarding the beacon-emitting devices, may include a make and/or model of the beacon-emitting devices (e.g., by providing a Stock Keeping Unit ("SKU")).

Demo device 205 may output (at 310) information regarding the detected beacons, and/or information regarding demo device 205. For example, demo device 205 may output the Bluetooth device names, MAC addresses, SSIDs, etc., of the one or more devices from which beacons were detected. Additionally, or alternatively, demo device 205 may output information regarding demo device 205. For instance, demo device 205 may output information regarding a make and/or model of demo device 205 (e.g., may provide a SKU), an MDN of demo device 205, a MAC address of demo device 205, and/or other identifying information. As shown, this information may be provided to demo device admin server 215, in some implementations. The information may be provided, via, for example, the Internet. For instance, demo device 205 may be pre-configured with locator information (e.g., a Uniform Resource Locator ("URL"), Uniform Resource Identifier ("URI"), or an IP address) associated with demo device admin server 215, via which demo device 205 can contact demo device admin server 215.

In some implementations, the information (outputted at 310) may be provided to a local device, such as a tablet, a laptop, etc., that is being run by a store manager that is setting up demo device 205. The store manager may indicate, as part of the setup process, whether demo device 205 should also act as a beacon-emitting device. In this manner, from the perspective of the retail store, setting up demo device 205 to also include beacon functionality may be a relatively simple process (e.g., the employee setting up the demo device may make a selection to enable beacon functionality, or beacon functionality may be automatically enabled when supported by demo device 205 and the retail store).

Demo device admin server 215 may validate (at 315) demo device 205 based on the information provided by demo device 205 (e.g., the information regarding nearby beacon-emitting devices, and/or the information associated with demo device 205). For instance, demo device admin server 215 may determine whether an MDN, associated with demo device 205, is an approved MDN for demo devices. As another example, demo device admin server 215 may compare the MAC address (and/or another identifier) of demo device 205 to a list of approved MAC addresses. Additionally, or alternatively, demo device admin server 215 may make the determination, in whole or in part, based on the surrounding beacon-emitting devices (e.g., in situations where it would be considered likely that demo device 205 is a demo device because other surrounding devices are demo devices).

Demo device admin server 215 may also identify (at 315) content associated with demo device 205. For instance, based on a make and/or model of demo device 205, demo device admin server 215 may identify locator information (e.g., a URL, URI, or IP address) of content associated with demo device 205. The locator information may include locator information for targeted content engine 225 (e.g., a URL, URI, or IP address of targeted content engine 225), and/or to another device (e.g., a web server, associated with a manufacturer of demo device 205 or a service provider associated with demo device 205, that includes the content).

Demo device admin server 215 may further generate (at 315) beacon info for demo device 205. For instance, demo device admin server 215 may generate a unique identifier, associated with demo device 205, for demo device admin server 215 to include when outputting a beacon. In some implementations, demo device admin server 215 may also include other types of information, such as the hierarchical information mentioned above (e.g., a store in which demo device 205 is located, a section of a store in which demo device 205 is located, etc.), which may be determined based on other beacon-emitting devices detected by demo device 205. In some implementations, the information may include configuration information to enable demo device 205 to function as a beacon in the context of an existing beacon network of the retail store. For example, the information may include particular protocols or other information that will allow demo device 205 to function as a beacon device in a manner that is seamless with existing beacon devices (e.g., such as dedicated, "non-demo device," beacon devices).

Demo device admin server 215 may output (at 320) the beacon information for demo device 205, as well as the content information (e.g., locator information for the content) to demo device 205. Demo device 205 may, in some implementations, obtain (at 325) content associated with demo device 205 (e.g., from targeted content engine 225), using the content information (e.g., URL, URI, or IP address). In some implementations, in lieu of obtaining the content, demo device 205 may store the locator information, and may provide the locator information upon request (e.g., a request from customer device 210).

In some implementations, information, regarding existing beacons (e.g., other demo devices 205 and/or other types of beacon-emitting devices) may be provided to demo device 205. For example, a store layout and/or information regarding other demo devices/beacons in the store may be provided to demo device 205. This may aid demo device 205 in seamlessly joining an existing network of beacons and/or demo devices 205.

Demo device 205 may output (at 330) a beacon, using the received beacon information. For example, demo device 205 may broadcast a BLE beacon, using a Bluetooth device name that was set for demo device 205 as its unique identifier (e.g., by demo device admin server 215). For example, demo device 205 may put itself into a "discoverable" Bluetooth mode. As another example, demo device 205 may create a Wi-Fi network, using an SSID that was set as a unique identifier of demo device 205. Demo device 205 may output the beacon by broadcasting the SSID in a "visible" mode. In other implementations, demo device 205 may output a beacon according to another technology (e.g., another short-range wireless technology). In some implementations, the outputting of the beacon may be preceded by setting up the relevant parameters in demo device 205 (e.g., setting a Bluetooth device name of demo device 205), and/or enabling (e.g., powering on) relevant radio transceivers.

As further shown, customer device 210 may detect (at 335) the beacon. For example, a Bluetooth radio, of customer device 210, may detect that demo device 205 is broadcasting its device name and is in a "discoverable" mode. As another example, a Wi-Fi radio, of customer device 210, may detect the visible SSID of demo device 205. In some implementations, customer device 210 may connect to demo device 205 (e.g., may perform a Bluetooth pairing operation, may establish a Wi-Fi connection, etc.). For instance, an application running on customer device 210 may cause customer device 210 may connect to demo device 205. As mentioned above, customer device 210 may provide identifying information, associated with customer device 210 (e.g., an MDN, an IMEI, an IMSI, etc.), to demo device 205. In some implementations, customer device 210 and demo device 205 may not establish a connection.

Customer device 210 may obtain (at 340) the content associated with demo device 205. For example, in situations where demo device 205 and customer device 210 have established a connection (and where demo device 205 has previously obtained (at 325) the content), demo device 205 may provide the content for presentation on customer device 210. In some implementations, and as described in greater detail below, customer device 210 may obtain the content from targeted content engine 225 (e.g., using a URL, URI, IP address, etc.) associated with targeted content engine 225.

In some implementations, targeted content engine 225 (and/or another device) may track information regarding user activity (e.g., demo devices 205 for which customer device 210 has received content, requested additional information, etc.), and may use this information to further customize the customer's retail experience.

Figure 4:
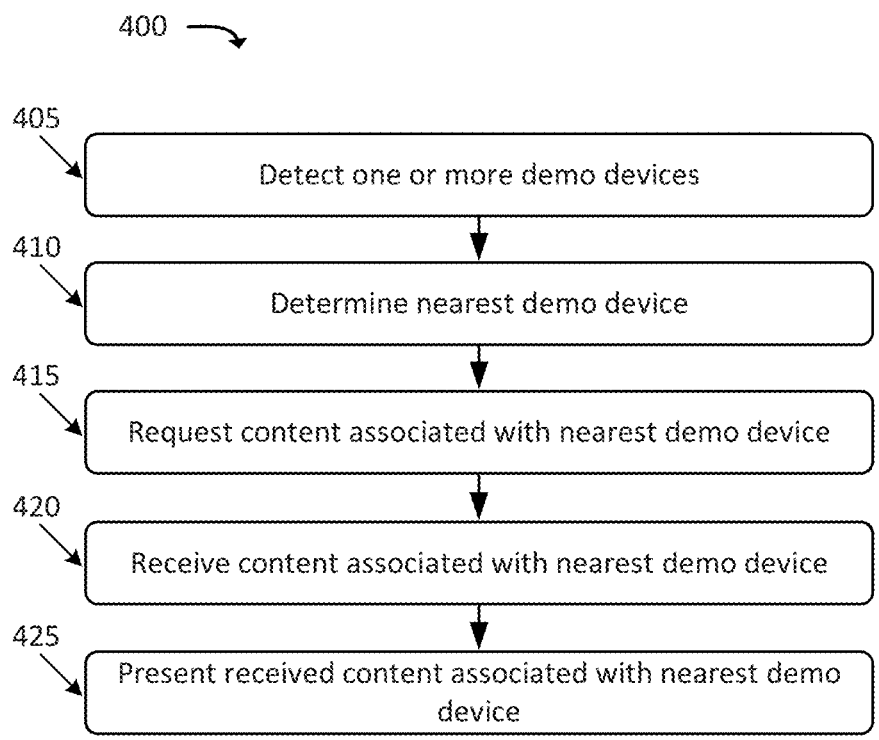
FIGS. 4 and 5 illustrate example processes for presenting targeted content, regarding a demo device, to a user.

FIG. 4 illustrates a process 400 for presenting targeted content, associated with a demo device 205, to customer device 210. In some implementations, process 400 may be performed by customer device 210. In some implementations, some of process 400 may be performed by one or more other devices (e.g., an external display device) in conjunction with, or in lieu of, customer device 210.

As shown, process 400 may include detecting, at 405, one or more demo devices. For example, customer device 210 may detect a BLE beacon, a Wi-Fi beacon, and/or another type of wireless beacon outputted (e.g., wirelessly broadcasted) by one or more demo devices. In some implementations, customer device 210 may detect demo device 205 based on physically contacting (or coming very close to, such as within 1-10 centimeters of) demo device 205.

As mentioned above, demo device 205 may output the beacons, so that the presence of demo device 205 can be detected by customer device 210. The beacons may include an identifier associated with demo device 205, such as a Bluetooth device name, a Wi-Fi SSID (e.g., in instances where demo device 205 outputs a beacon by establishing a Wi-Fi network), a MAC address, a mobile directory number ("MDN"), and/or another identifier. Demo device 205 may output the beacons on a continuous basis, a periodic basis, and/or an otherwise intermittent basis. The identifier may, in some implementations, be an identifier assigned to demo device 205 by demo device admin server 215. For example, when registering with demo device 205, demo device admin server 215 may provide a unique alphanumeric combination for demo device 205 to use as a Bluetooth device name, as a Wi-Fi SSID, and/or to otherwise include in the beacon.

In some implementations, a beacon may include information in addition to, or in lieu of, a unique identifier associated with a particular demo device 205. For instance, in some implementations, a beacon may include information indicating a type of device of demo device 205 (e.g., a make and/or model), information regarding device capabilities (e.g., features of demo device 205, such as screen size and/or resolution, Wi-Fi interface speed, whether demo device 205 is equipped with NFC and/or other types of radios, etc.). As yet another example, the beacon may include information regarding advertising content associated with demo device 205 (e.g., a Uniform Resource Locator ("URL") or other type of pointer based on which advertising information, associated with demo device 205, can be obtained).

Process 400 may also include determining, at 410, the nearest demo device. For example, in situations where customer device 210 detects multiple beacons from multiple demo devices 205, customer device 210 may determine the nearest demo device 205 based on, for example a signal strength (e.g., a Received Signal Strength Indicator ("RSSI")) of the beacons, and/or a transmit power associated with the beacons (e.g., in situations where the transmit power is indicated by the beacons). For example, customer device 210 may determine that a demo device 205 that outputs a first beacon is closer than a second demo device 205 that outputs a second beacon with a lower signal strength than the first beacon.

Process 400 may further include requesting (at 415) content associated with the nearest demo device. For example, once customer device 210 has determined the nearest demo device 205, customer device 210 may output a request for content associated with the nearest demo device 205. In implementations, customer device 210 may include an application (e.g., at the application level, at the operating system level, and/or at another level) that requests the content.

In some implementations, customer device 210 may request the content from targeted content engine 225. The request may include some or all of the information included in, or extracted from, the received beacon. For instance, the request may include an identifier associated with demo device 205. In some implementations, the request may include information regarding customer device 210, such as an MDN of customer device 210, a MAC address associated with customer device 210, a name of a user associated with customer device 210, an International Mobile Station Equipment Identity ("IMEI") associated with customer device 210, an International Mobile Subscriber Identity ("IMSI") value associated with customer device 210, a geographic location of customer device 210 (e.g., as determined by a global positioning system ("GPS") component of customer device 210), device capabilities of customer device 210 (e.g., a screen size and/or resolution, upload and/or download throughput, latency, etc.), and/or other information associated with customer device 210.

The information, included in the request, may be used (e.g., by targeted content engine 225) to determine which content to provide to customer device 210. For example, demo device 205 may select video content based on a screen size and/or resolution of customer device 210 (e.g., if customer device 210 has a smaller screen, targeted content engine 225 may select smaller sized and/or differently encoded video content than if customer device 210 has a larger screen). As another example, targeted content engine 225 may select more data-intensive content (e.g., higher fidelity video content) when customer device 210 has higher download throughput than when customer device 210 has lower download throughput.

In some implementations, as mentioned above, targeted content engine 225 may select targeted advertisement based on information associated with a user of customer device 210. For instance, targeted content engine 225 may use identifying information, provided by customer device 210 (e.g., the MDN of customer device 210, the IMEI of customer device 210, etc.) to obtain user information from customer info repository 220. For instance, targeted content engine 225 may obtain demographics information, user history information, etc. Targeted content engine 225 may use the obtained information to select targeted advertising content that is tailored the particular user of customer device 210. For example, if the user of customer device 210 is an adolescent youth, the selected advertising may be different than if the user is an elderly individual. As another example, if the user of customer device 210 is a male, the selected advertising may be different than if the user is a female.

While examples are described above of targeted advertising content being obtained from targeted content engine 225, in some implementations, one or more other devices may provide the targeted advertising content to customer device 210. For example, in some implementations, customer device 210 may obtain the targeted advertising content directly from demo device 205. For instance, demo device 205 may store advertising content (e.g., may receive the content as part of a registration process with demo device admin server 215), and may receive a request for the content from customer device 210 (e.g., via an established connection, such as a Bluetooth connection, a Wi-Fi connection, etc.; or via network 230 (e.g., the Internet)). When receiving the request, demo device 205 may provide the content to customer device 210, and/or may select targeted content (e.g., by communicating with targeted content engine 225, which may instruct demo device 205 as to which content to output). In some implementations, demo device 205 may perform the selection of content, described above with respect to targeted content engine 225, and may provide the selected content to customer device 210.

Process 400 may additionally include receiving (at 420) content associated with the nearest demo device. For example, customer device 210 may receive the content, outputted (at 415) by targeted content engine 225 (and/or by one or more other devices, such as demo device 205).

Process 400 may also include presenting (at 425) the content associated with the nearest demo device. For example, customer device 210 may present the content as a pop-up, within an application ("app"), etc. As described in greater detail below, the content may include interactive content, such as buttons, that may allow the user to stop viewing the content, request additional assistance, etc.

In some implementations, one or more of the operations shown in FIG. 4 may be performed automatically (e.g., without user intervention, and/or without a specific request from the user to perform particular operations). For instance, customer device 210 may detect a demo device without a customer selecting an option to detect demo devices, may request the content without the customer selecting an option to request the content, and/or may present the content without the customer selecting an option to present the content. Additionally, or alternatively, in some implementations, user feedback may be requested before one or more operations are performed, and may be presented via prompts or pop-ups. For instance, when a demo device is detected, customer device 210 may prompt the user before requesting the content and/or before presenting the content (e.g., may ask the user, "Do you want to view content associated with this demo device?"). The content, presented to the user, may include precision marketing, an option to update the software of customer device 210, an offer for sale of accessories for customer device 210, a recommendation of "at par" devices (e.g., devices that are similar to, or better than, customer device 210), etc.

Figure 5:
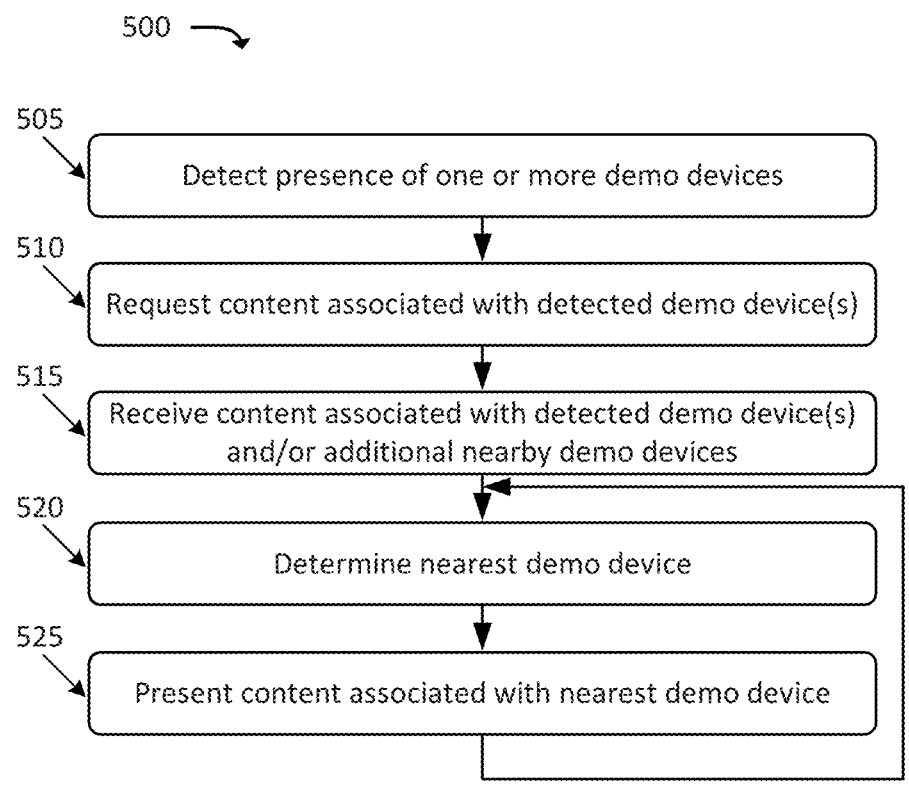

FIG. 5 illustrates another example process 500 for presenting content associated with demo device 205. Process 500 may include verifying, on an ongoing basis, whether content that is being presented is content associated with the nearest demo device 205. For instance, if a customer is walking around in a store, he or she may come across different demo devices 205. Ensuring that the content displayed on customer device 210 is related to the nearest demo device 205 may ensure that the user is being presented with relevant content. Process 500 may further facilitate the quick switching of content from one content to another, by caching the content for multiple demo devices on customer device 210.

As shown, process 500 may include detecting (at 505) the presence of one or more demo devices. For instance, customer device 210 may detect one or more beacons from one or more demo devices 205.

Process 500 may also include requesting (at 510) content associated with the detected demo devices. For instance, customer device 210 may request, content associated with the detected demo devices 205, from targeted content engine 225 (and/or from another source). In some implementations, targeted content engine 225 may identify targeted content associated with the detected demo devices 205, a type of device of customer device 210, information regarding a user of customer device 210, etc.

In some implementations, targeted content engine 225 may identify one or more additional demo devices 205, which may be in the vicinity of the detected demo devices 205. For example, if the detected demo devices 205 are in a particular section of a store, targeted content engine 225 may identify other demo devices 205 in the same section of the store (and/or a nearby section of the store). Targeted content engine 225 may make this determination based, for instance, information received from demo device admin server 215. For instance, demo device admin server 215 may maintain information indicating locations of demo devices 205, and/or layouts of stores in which demo devices 205 are present. As another example, demo device admin server 215 may maintain information regarding demo devices 205 that are related in some way, but are not necessarily located close to each other. For example, related demo devices 205 may share the same or similar attributes, such as operating system, screen size, resolution, manufacturer, wireless service provider, etc. The information, regarding the other demo devices 205, may include information regarding a location of demo devices 205 (e.g., a section of a store in which the other demo devices 205 are located).

Process 500 may further include receiving (at 515) content associated with the detected demo devices and/or additional nearby demo devices. For instance, customer device 210 may receive the content, associated with the detected demo devices 205 (e.g., advertising for demo devices 205, targeted to a user of customer device 210), from targeted content engine 225. Additionally, or alternatively, customer device 210 may receive content associated with one or more other demo devices 205, in addition to the detected demo devices 205. For example, as mentioned above, these additional demo devices 205 may be demo devices 205 that are near the detected demo devices 205, are in the same section, are in a neighboring section, etc. As also mentioned above, the content regarding the additional demo devices 205 may include information that indicates how to locate the additional demo devices 205 (e.g., a section of a store in which the additional demo devices 205 are located).

Customer device 210 may store the content (e.g., in a local memory), for later presentation to a user of customer device 210. When storing particular content, customer device 210 may store an indication of which demo device 205 is associated with the particular content. For instance, targeted content engine 225 may provide identifiers, with the content, that relate to the beacons outputted by demo device 205 (e.g., Bluetooth device names, SSIDs, etc.), and customer device 210 may use these identifiers to denote which content corresponds to which demo device 205.

Process 500 may additionally include determining (at 520) the nearest demo device. For example, as mentioned above, customer device 210 may determine the nearest demo device 205 based on signal strength and/or one or more other factors. Process 500 may also include presenting (at 525) content associated with the nearest demo device (e.g., the content received from targeted content engine 225, at 515).

Portions of process 500 may iteratively repeat on an ongoing basis. For example, as shown, customer device 210 may determine (at 520), on an ongoing basis (e.g., periodically and/or intermittently) which demo device 205 is the nearest demo device 205. The determination may change when the user of customer device 210 moves from one location to another (e.g., to different sections of a store, to different promotional displays within a store, etc.).

Once a different demo device 205 is determined (at 520) to be the nearest demo device, customer device 210 may present (at 525) the content associated with the newly determined nearest demo device 205. When presenting this content, customer device 210 may retrieve the content locally, as the content may have already been received (at 515) from targeted content engine 225. In this manner, customer device 210 may be able to quickly provide content associated with multiple demo devices 205, instead of having to download new content each time a new demo device 205 is detected.

Figure 6:
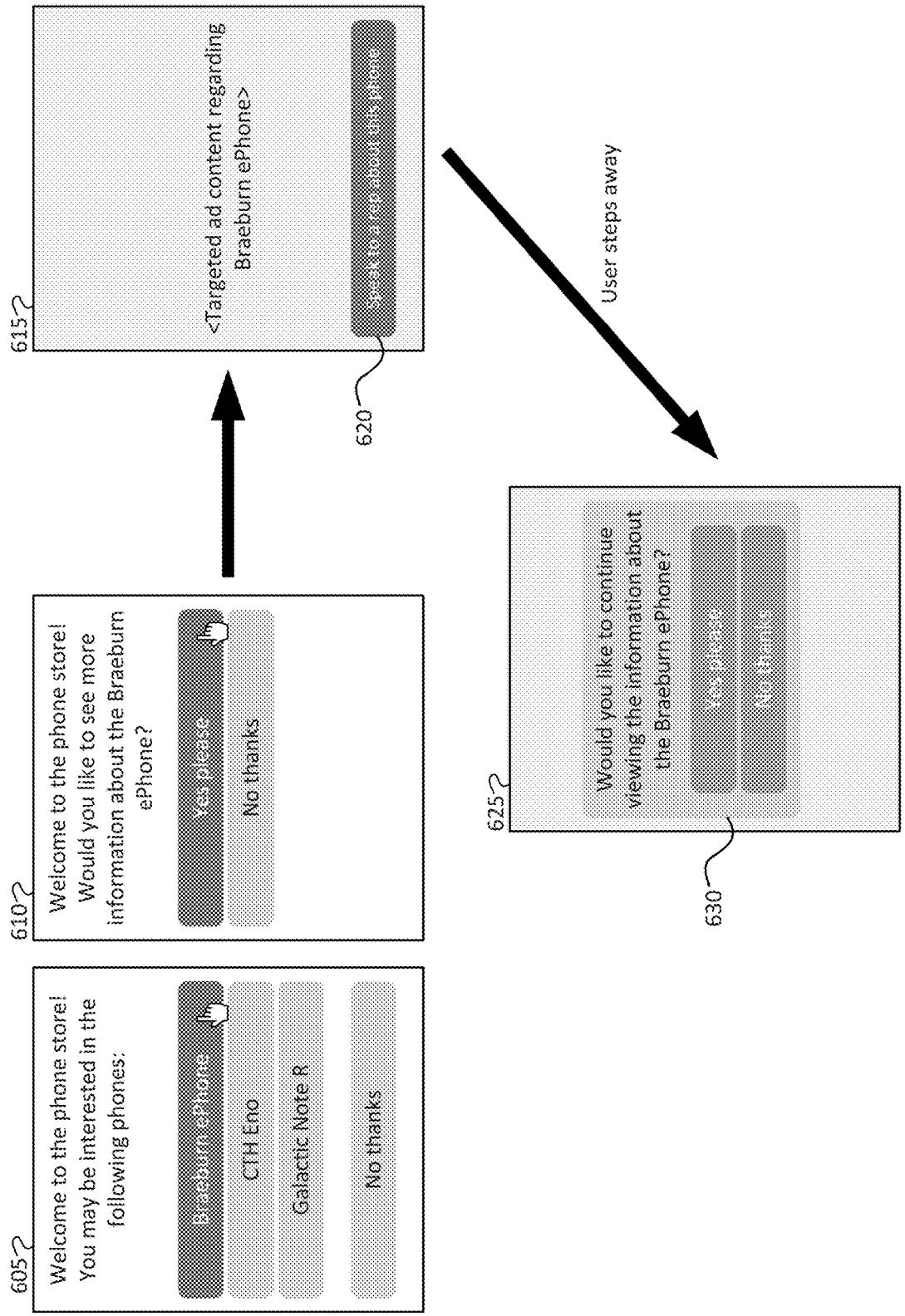
FIGS. 6 and 7 illustrate example user interfaces that correspond to the presentation of targeted content regarding a demo device.
Figure 7:
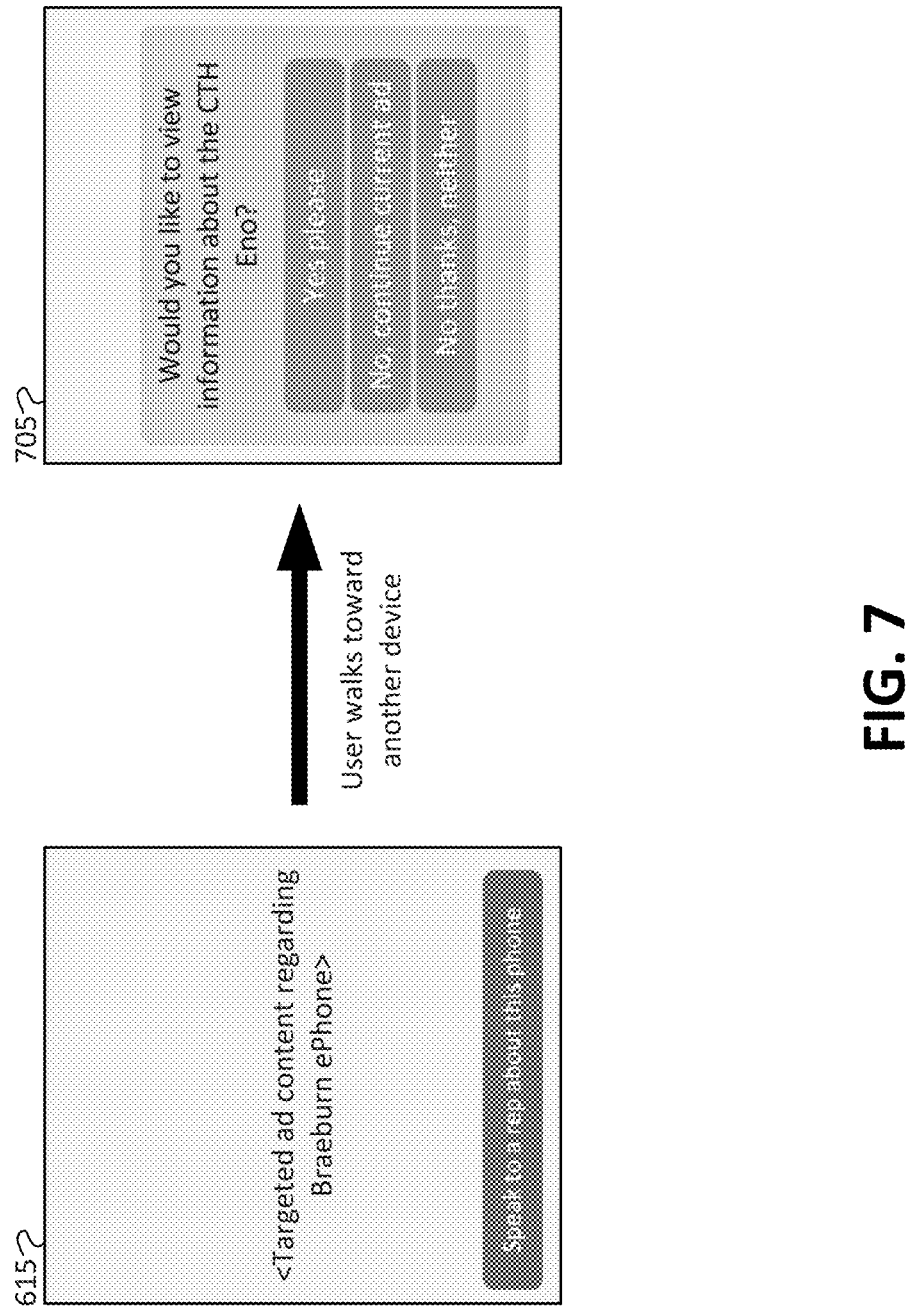

FIGS. 6 and 7 illustrate example user interfaces that correspond to the presenting of content associated with demo devices 205. In some implementations, these user interfaces may be presented by customer device 210 (e.g., in accordance with block 425 of FIG. 4, and/or with block 525 of FIG. 5).

User interfaces 605 and 610, shown in FIG. 6, may be triggered upon the entrance of customer device 210 into a region in which demo devices 205 are present. For example, customer device 210 may detect a particular demo device 205, and/or some other device (e.g., another beacon, other than demo device 205). User interface 605 may present options to access content for one or more demo devices 205, in which a user of customer device 210 may be interested. These demo devices 205 may be determined based on, for example, user information (e.g., as stored by customer info repository 220), a proximity of customer device 210 to the particular demo devices 205, and/or one or more other factors. User interface 610 may present the opportunity ("Yes please") to access content associated with a particular demo device 205 (e.g., a particular demo device 205 that is closest to customer device 210—the "Braeburn ePhone," in this example).

Once the user has selected to view content associated with a particular demo device 205 (e.g., by selecting "Yes please" in either of user interfaces 605 or 610), user interface 615 may be presented. In some implementations, user interfaces 605 and/or 610 may not be used, and user interface 615 may be presented (e.g., via a pop-up window). As shown, user interface 615 may include a display area in which targeted ad content regarding demo device 205 is presented. As mentioned above, the content may include video content, audio content, still image content, web content, etc. As further shown, user interface 615 may include selectable option 620, to speak to a representative ("rep") regarding demo device 205. The selection of option 620 may trigger a communication to, for example, a sales representative (either in store or remote). For example, the selection of option 620 may initiate a telephone call, a text message (e.g., a Short Messaging Service ("SMS") message), an instant message, and/or another type of message to a suitable recipient.

User interface 625 may be presented when the user of customer device 210 steps away from demo device 205. User interface 625 may include display area 630, which may prompt the user as to whether he or she would like to continue viewing content associated with demo device 205. In some implementations, display area 630 may be a pop-up (e.g., overlaid over the targeted ad content shown in user interface 615).

As shown in FIG. 7, user interface 615 (e.g., as similarly described above) may be presenting content associated with a particular demo device 205. After moving from demo device 205, customer device 210 may detect that a different demo device 205 is closer to customer device 210, and may present user interface 705. In user interface 705, the user may be prompted to access content associated with the demo device 205 that is now closer, the demo device 205 for which content was previously being accessed, or neither. As mentioned above, in some implementations, the content for the now closer demo device 205 may have been retrieved previously (e.g., when customer device 210 came near the original demo device 205).

Figure 8:
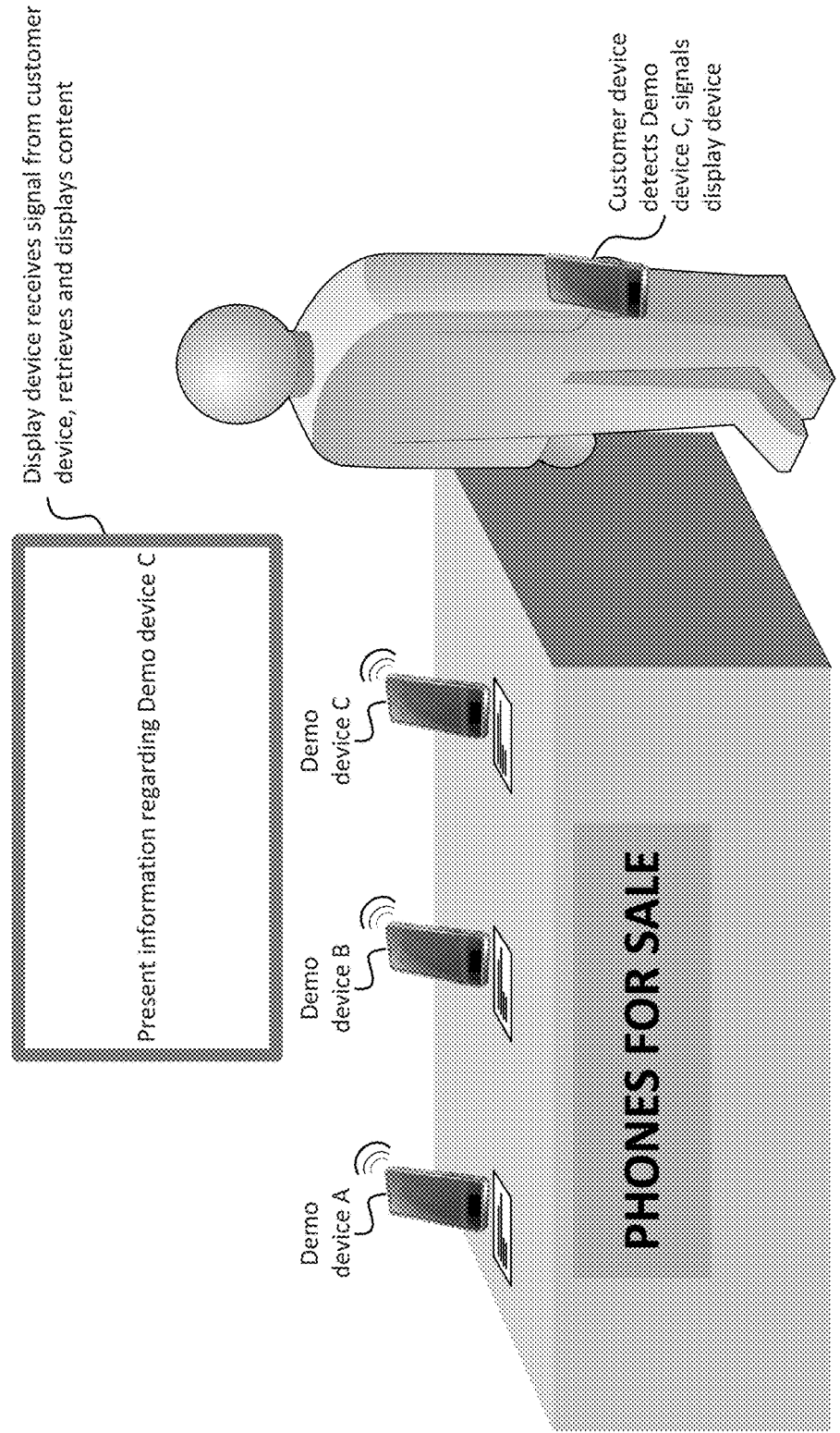
FIG. 8 illustrates an example of presenting targeted content, regarding a demo device, via an external display device.

While examples are described above in the context of customer device 210 presenting content associated with demo devices 205, in some implementations, content may be displayed on one or more other devices, in lieu of (or in addition to) customer device 210. For example, as shown in FIG. 8, a customer device may detect that Demo device C is nearby. The customer device may signal an external display device (e.g., a monitor with hardware and/or software that is capable of communicating with the customer device), and indicate that the customer device is near Demo device C. Additionally, or alternatively, the customer device may communicate with another device (e.g., targeted content engine 225), which may instruct the external presentation device to display particular content (e.g., generic and/or targeted ad content associated with Demo device C).

Figure 9:
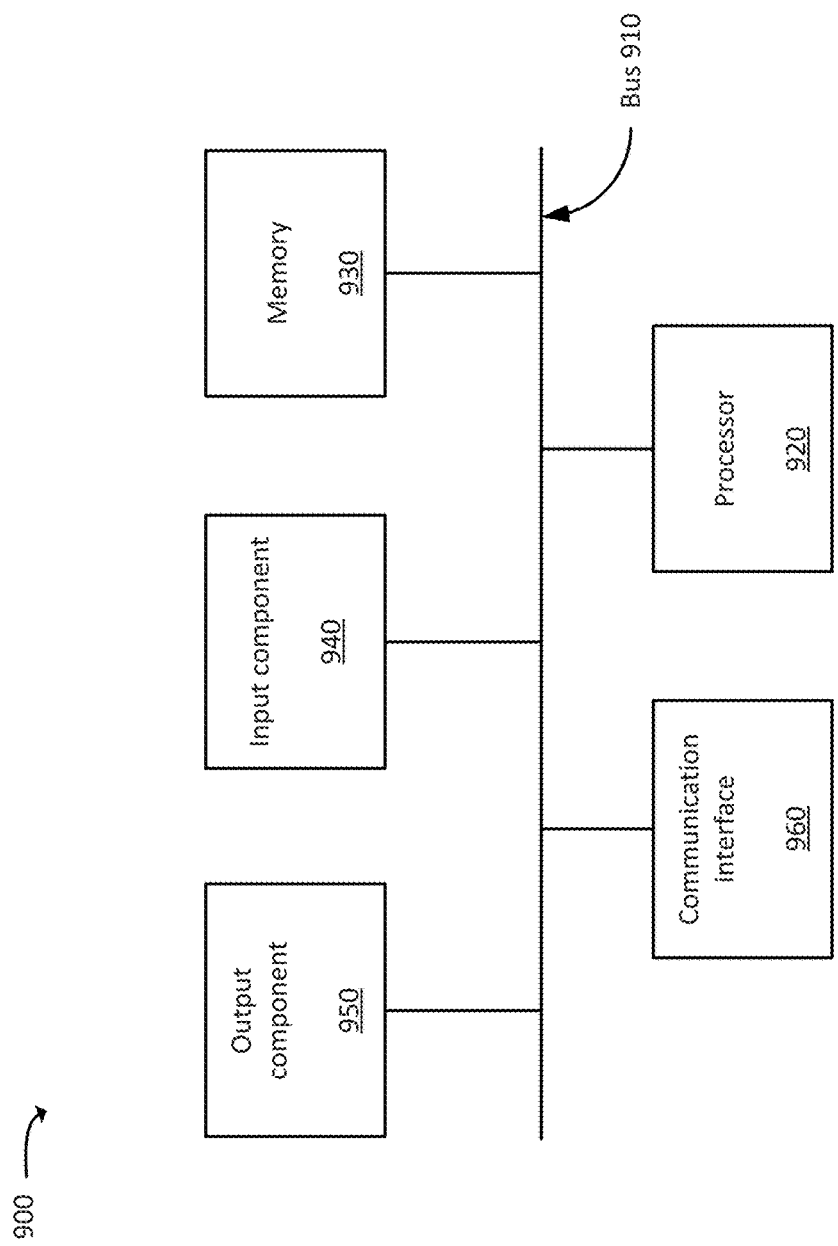
FIG. 9 illustrates example components of a device, in accordance with some implementations described herein.

FIG. 9 is a diagram of example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 3-5, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar s) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
a memory device storing:
a plurality of unique identifiers that are each associated with a respective beacon device, of a plurality of beacon devices, wherein the unique identifiers are wirelessly broadcasted by the plurality of beacon devices,
identifying information of a particular device that is approved to be used as a beacon device, and
a set of processor-executable instructions; and
a processor configured to execute the processor-executable instructions, wherein executing the processor-executable instructions causes the system to:
receive, from the particular device, identifying information associated with the particular device, wherein the particular device is a same type of device as a device that is being offered for sale;
determine that the identifying information, received from the particular device, matches the stored identifying information of the particular device;
receive, from the particular device, at least one unique identifier, of the plurality of unique identifiers,
wherein the at least one unique identifier has been wirelessly broadcasted by at least one device, of the plurality of devices, and has been wirelessly detected by the particular device;
determine that the at least one unique identifier, that has been wirelessly detected by the particular device, matches at least one unique identifier of the stored plurality of unique identifiers of the plurality of beacon devices;
validate the particular device based on:
the determination that the identifying information, received from the particular device, matches the stored identifying information of the particular device, and
the determination that the received at least one unique identifier, that was wirelessly detected by the particular device, matches the at least one unique identifier of the stored plurality of unique identifiers of the plurality of beacon devices;
assign, based on validating the particular device, a particular unique identifier to the particular device, the particular unique identifier being unique with respect to the unique identifiers that are associated with the plurality of beacon devices;
determine, based on the identifying information associated with the particular device, locator information for content regarding the particular device; and
output, to the particular device:
the unique identifier associated with the particular device, and
the locator information for the content regarding the particular device, wherein the particular device is configured to:
receive and store the unique identifier assigned by the system to the particular device;
broadcast, via a short-range wireless technology, beacon signals that include the stored unique identifier, associated with the particular device, that was assigned to the particular device by the system,
receive, from a user device and in response to the broadcasting of the beacon signals, a request for the content regarding the particular device, and
provide, to the user device and in response to the request, at least one of:
the content regarding the particular device, or
the locator information for the content regarding the particular device.

2. The system of claim 1, wherein the unique identifier is used by the particular device as a particular Bluetooth device name, and
wherein the particular device broadcasts the beacon signals by advertising the particular device as a discoverable Bluetooth device having the particular Bluetooth device name.

3. The system of claim 1, wherein the unique identifier is used by the particular device as a particular Wi-Fi Service Set Identifier ("SSID"), and
wherein the particular device broadcasts the beacon signals by creating a Wi-Fi network having the particular SSID as a visible SSID.

4. The system of claim 1, wherein the identifying information, regarding the particular device, includes a mobile directory number ("MDN") associated with the particular device,
wherein the validation of the particular device further includes determining whether the MDN matches one or more MDNs that have been previously approved for beacon devices.

5. The system of claim 1, wherein executing the processor-executable instructions further causes the system to:
obtain the content, using the locator information, from a device that hosts the content; and
establish a connection with the user device, wherein the content is provided to the user device via the established connection.

6. A device, comprising:
a memory device storing a set of processor-executable instructions; and
a processor configured to execute the processor-executable instructions, wherein executing the processor-executable instructions causes the device to:
wirelessly detect one or more identifiers that have been broadcasted by one or more beacon-emitting devices;

output, to an admin device, a request to register as a beacon-emitting device, the request including:
    identifying information regarding the device, and
    the one or more identifiers that have been wirelessly detected by the device,
    wherein the admin device validates the request based on the identifying information and the one or more identifiers that have been wirelessly detected by the device;
receive, from the admin device, an indication that the request has been validated, the indication including a unique identifier assigned by the admin device, wherein the unique identifier is unique with respect to identifiers, assigned by the admin device for one or more other beacon-emitting devices;
obtain, based on receiving the indication that the request has been validated, locator information for promotional content that provides information regarding one or more features of the device;
output, based on receiving the indication that the request has been validated, and via a short-range wireless technology, beacon signals that include the unique identifier assigned by the admin device;
receive, from a user device and in response to the beacon signals, a request for the promotional content; and
provide, to the user device and based on the request, at least one of:
    the promotional content regarding the one or more features of the device, or
    the locator information for the promotional content.

7. The device of claim 6, wherein outputting the beacon signals includes broadcasting the beacon signals, on a periodic or intermittent basis, via a wireless radio associated with the short-range wireless technology.

8. The device of claim 6, wherein the identifying information includes at least one of:
    a mobile device number ("MDN") associated with the device,
    a Stock Keeping Unit ("SKU") associated with the device, or
    a Media Access Control ("MAC") address associated with the device.

9. The device of claim 6, wherein the unique identifier, received from the admin device, includes a Bluetooth device name, wherein outputting the beacon signals includes advertising the device as a discoverable Bluetooth device having the particular Bluetooth device name.

10. The device of claim 6, wherein the unique identifier, received from the admin device, includes a particular Wi-Fi Service Set Identifier ("SSID"), and wherein outputting the beacon signals includes creating a Wi-Fi network having the particular SSID.

11. The system of claim 1, wherein the content regarding the particular device includes at least one of:
    features associated with the particular device,
    discounts associated with the particular device, or
    capabilities of the particular device.

12. The system of claim 1, wherein executing the processor-executable instructions further causes the system to:
    output, to a display device that is separate from the user device and in response to the request, the content for display via the display device.

13. A method, comprising:
    storing a plurality of unique identifiers that are each wirelessly broadcasted by a respective beacon device, of a plurality of beacon devices;
    receiving, from a particular device, identifying information associated with the particular device;
    determining that the identifying information, received from the particular device, matches previously stored identifying information of the particular device;
    receiving, from the particular device, at least one unique identifier, of the plurality of unique identifiers, that has been broadcasted by at least one device of the plurality of devices, and has been wirelessly detected by the particular device;
    determining that the at least one unique identifier, that has been wirelessly detected by the particular device, matches at least one unique identifier of the stored plurality of unique identifiers of the plurality of beacon devices;
    validating the particular device based on:
        the determination that the identifying information, received from the particular device, matches the previously stored identifying information of the particular device, and
        the determination that the received at least one unique identifier, that was wirelessly detected by the particular device, matches the at least one unique identifier of the stored plurality of unique identifiers of the plurality of beacon devices;
    assigning, based on validating the particular device, a particular unique identifier to the particular device, the particular unique identifier being unique with respect to the unique identifiers that are associated with the plurality of beacon devices; and
    outputting, to the particular device, the unique identifier associated with the particular device, wherein outputting the unique identifier to the particular device causes the particular device to wirelessly broadcast beacon signals that include the stored unique identifier, associated with the particular device, that was assigned to the particular device by the system.

14. The method of claim 13, wherein the unique identifier is used by the particular device as a particular Bluetooth device name, and
    wherein the particular device broadcasts the beacon signals by advertising the particular device as a discoverable Bluetooth device having the particular Bluetooth device name.

15. The method of claim 13, wherein the unique identifier is used by the particular device as a particular Wi-Fi Service Set Identifier ("SSID"), and
    wherein the particular device broadcasts the beacon signals by creating a Wi-Fi network having the particular SSID as a visible SSID.

16. The method of claim 13, wherein the identifying information, regarding the particular device, includes a mobile directory number ("MDN") associated with the particular device,
    wherein the validation of the particular device further includes determining whether the MDN matches one or more MDNs that have been previously approved for beacon devices.

17. The method of claim 13, further comprising:
    identifying, based on the identifying information associated with the particular device, locator information for content associated with the particular device;
    receiving a request, from a user device, for the content associated with the particular device; and
    outputting, to the user device and in response to the request, the locator information for the content.

18. The method of claim 13, further comprising:
identifying, based on the locator information, content associated with the particular device;
obtaining the content associated with the particular device;
receiving a request, from a user device, for the content associated with the particular device; and
outputting, to the user device and in response to the request, the obtained content.

19. The method of claim 13, further comprising:
identifying, based on the identifying information associated with the particular device, content associated with the particular device;
receiving a request, from a user device, for the content associated with the particular device; and
outputting, to a display device that is separate from the user device and in response to the request, the content for display via the display device.

20. The device of claim 6, wherein executing the processor-executable instructions further causes the device to:
output, to a display device that is separate from the user device and in response to the request, the promotional content for display via the display device.

\* \* \* \* \*